(12) United States Patent
Sasahara et al.

(10) Patent No.: US 8,756,938 B2
(45) Date of Patent: Jun. 24, 2014

(54) GAS COMPRESSOR OPERATING METHOD AND GAS TURBINE EQUIPPED WITH GAS COMPRESSOR

(75) Inventors: Jun Sasahara, Tokyo (JP); Masamitsu Okuzono, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/268,763

(22) Filed: Oct. 7, 2011

(65) Prior Publication Data
US 2012/0247115 A1 Oct. 4, 2012

(30) Foreign Application Priority Data

Mar. 31, 2011 (JP) ................................. 2011-081101

(51) Int. Cl.
*F02C 9/00* (2006.01)
*F02C 7/00* (2006.01)
*F02G 3/00* (2006.01)

(52) U.S. Cl.
USPC ............................. 60/773; 60/779; 60/39.091

(58) Field of Classification Search
USPC ........ 60/39.091, 39.27, 794, 39.23, 773, 779, 60/39.281
See application file for complete search history.

(56) References Cited

U.S. PATENT DOCUMENTS

| | | | |
|---|---|---|---|
| 4,581,888 A * | 4/1986 | Schmitzer et al. | 60/39.091 |
| 5,508,943 A * | 4/1996 | Batson et al. | 700/287 |
| 7,210,895 B2 | 5/2007 | Kotani et al. | |
| 7,762,084 B2 * | 7/2010 | Martis et al. | 60/792 |
| 2006/0101826 A1 * | 5/2006 | Martis et al. | 60/794 |

FOREIGN PATENT DOCUMENTS

| | | |
|---|---|---|
| CN | 1650105 A | 8/2005 |
| CN | 1908405 A | 2/2007 |
| JP | 08-016479 B2 | 2/1996 |
| JP | 2000-337109 A | 12/2000 |
| JP | 2004-190633 A | 7/2004 |
| JP | 2005-146927 A | 6/2005 |
| JP | 2007-040171 A | 2/2007 |
| JP | 2007-239696 A | 9/2007 |
| KR | 10-0644418 B1 | 11/2006 |

OTHER PUBLICATIONS

International Search Report of PCT/JP2011/072233, date of mailing Dec. 27, 2011.
Japanese Notice of Allowance dated Apr. 23, 2013, issued in corresponding Japanese Patent Application No. 2013-507037, w/ English translation (3 pages).

(Continued)

*Primary Examiner* — Gerald L Sung
(74) *Attorney, Agent, or Firm* — Westerman, Hattori, Daniels & Adrian, LLP

(57) ABSTRACT

In a method for operating a gas compressor which compresses gas whose supply conditions change and which is equipped with an intake-flow regulating mechanism, a limit pressure ratio that defines the operational upper limit of the pressure ratio relative to the intake flow rate of the gas compressor or the degree of opening of the intake-flow regulating mechanism to prevent surging in the gas compressor is corrected by multiplying a reference limit pressure ratio calculated from the design conditions of the gas compressor by a first correction factor calculated depending on a detected operating-state value of the gas compressor.

13 Claims, 3 Drawing Sheets

(56) References Cited

OTHER PUBLICATIONS

A Decision to Grant a Patent dated Jul. 29, 2013, issued in corresponding Korean Patent Application No. 10-2013-7003471, w/ English translation (1 page).

Korean Office Action dated Apr. 25, 2013, issued in corresponding Korean Patent Application No. 10-2013-7003471; w/English translation (9 pages).

Chinese Office Action dated Jul. 30, 2013, issued in corresponding Chinese Patent Application No. 201180039750.4, w/English translation (12 pages).

* cited by examiner

FIG. 1
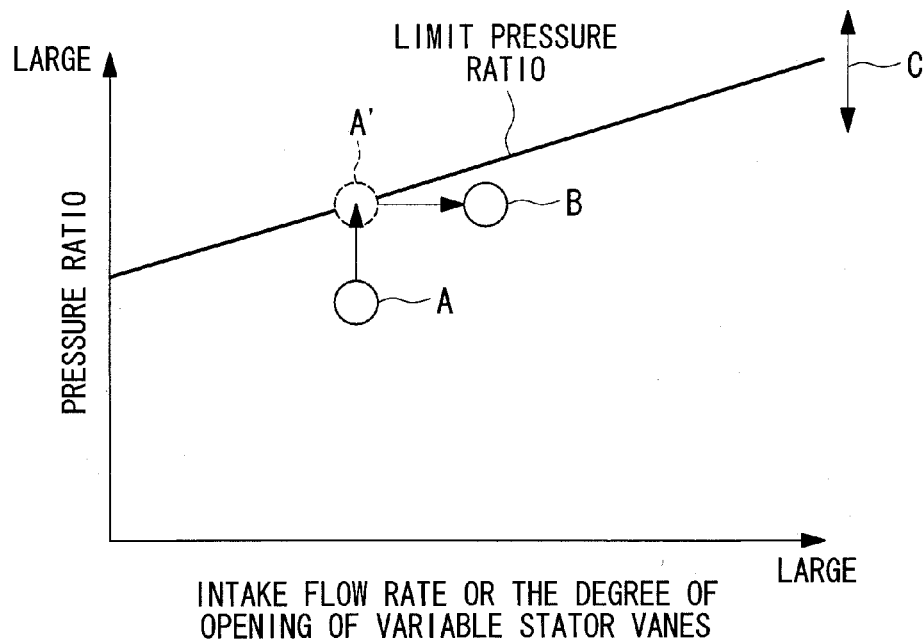
FIG. 2
(a) 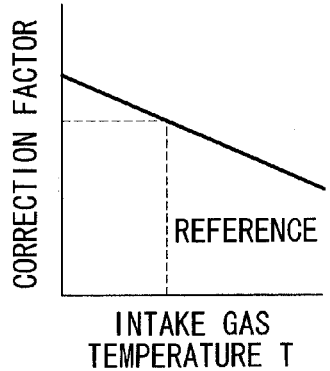  (b) 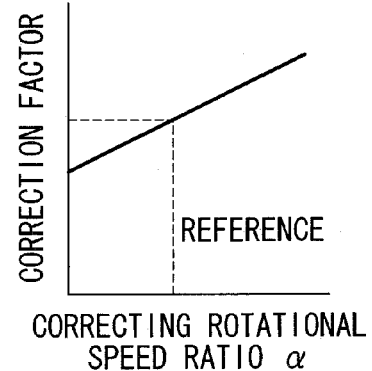
$$\text{CORRECTING ROTATIONAL SPEED RATIO } \alpha = \frac{N\sqrt{\kappa_0 R_0 T_0}}{N_0 \sqrt{\kappa R T}}$$

GAS COMPRESSOR OPERATING METHOD AND GAS TURBINE EQUIPPED WITH GAS COMPRESSOR

CROSS REFERENCE TO RELATED APPLICATIONS

This application claims benefit of Japanese Application No. 2011-081101 filed in Japan on Mar. 31, 2011, the contents of which is hereby incorporated by its reference.

BACKGROUND OF THE INVENTION

1. Field of the Invention

The present invention relates to a gas compressor operating method applied to a gas compressor in which gas fuel supply conditions change, such as a gas compressor for compressing gas fuel, employed in a low-calorie-gas-fired gas turbine that uses low-calorie gas, such as steelmaking byproduct gas (BFG), as the fuel, and to a gas turbine operated with this operating method.

2. Description of Related Art

A known gas turbine plant in the related art is operated using low-calorie gas as the fuel, such as steelmaking byproduct gas (blast furnace gas: BFG) generated in a large amount in a steelmaking process, that is, a low-calorie-gas-fired gas turbine (hereinafter referred to as "gas turbine") operated using low-calorie gas as fuel. Such a gas turbine uses a gas compressor that compresses low-pressure gas fuel and supplies the compressed gas fuel to a combustor. Accordingly, to prevent surging in the gas compressor, with regards to "pressure ratio" on the vertical axis versus "degree of opening of variable stator vanes" on the horizontal axis, a "limit pressure ratio" for operation is provided, as indicated by the solid line in FIG. 1.

The limit pressure ratio is a value that defines the operational upper limit of the pressure ratio between an intake absolute pressure and a discharge absolute pressure of the gas compressor for preventing surging. Accordingly, to prevent surging in the gas compressor, the operation is controlled so as to ensure some allowance for the surging limit by adjusting the degree of opening of the variable stator vanes (intake-flow regulating mechanism) so that the limit pressure ratio is not exceeded.

That is, in FIG. 1, when the pressure ratio rises from point A and increases, the pressure ratio will coincide with the limit pressure ratio at point A' unless the degree of opening of the variable stator vanes is changed, and thus, operation that makes the pressure ratio increase further becomes impossible. However, if the variable stator vanes are actuated in an opening direction as the pressure ratio increases from point A, the limit pressure ratio also increases, as indicated by point A to point B in FIG. 1, which increases the operating range of the pressure ratio in which the occurrence of surging can be prevented, thus generating some allowance for a safe operating range.

Increasing the degree of opening of the variable stator vanes as described above means that a gas turbine that receives the supply of gas fuel whose pressure is increased by the gas compressor performing a gas fuel bypass operation.

Furthermore, the gas turbine that receives the supply of gas fuel whose pressure is increased by the gas compressor is provided with an interlock that immediately halts the operation to protect the equipment when the operating pressure ratio has exceeded the limit pressure ratio.

A known example of the related art for preventing surging in a compressor is a compressor-surging prevention system for a carbon-dioxide-recovery power generating plant, as disclosed in Japanese Unexamined Patent Application, Publication No. 2000-337109. In this case, the fluctuating concentration ratio between water vapor and carbon dioxide is controlled by a flow regulating valve to prevent surging in a compressor that uses a gaseous mixture of water vapor and carbon dioxide as a working fluid.

Furthermore, the power output of a gas turbine power generation system that mainly uses blast furnace gas changes with a change in the calorific value of the blast furnace gas generated. Therefore, as disclosed in Japanese Unexamined Patent Application, Publication No. 2004-190633, for example, calorific value control is performed by adding a cooling gas or a heating gas depending on the result of measurement of the gas fuel calorific value; however, because unstable combustion or blow-off sometimes occurs due to a delay in response to sudden changes in calorific value, it is disclosed that the system is stabilized by rapid control for calculating the calorific value of the gas fuel in real time.

The foregoing low-calorie-gas-fired gas turbine sometimes shows changes in the temperature of gas fuel supplied to the gas compressor (intake gas temperature) or uses unstable gas fuel whose gas fuel composition changes significantly, as in the case where a plurality of gas fuels with different compositions are mixed.

If the gas fuel supply conditions, such the an intake gas temperature and the gas fuel composition described above, change significantly, the intake gas temperature (T), the gas constant (R), and the specific heat ratio ($\kappa$), which are values that influence the surging limit pressure ratio, also change. That is, changes in the gas fuel supply conditions, such as the intake gas temperature and the gas fuel composition, will change the characteristics of the limit pressure ratio for preventing surging in the gas compressor.

However, in the known methods for operating a gas turbine equipped with a gas compressor that compresses gas fuel whose supply conditions change and supplies the compressed gas fuel to a combustor and in which the gas compressor is provided with variable stator vanes, changes in the gas fuel supply conditions for the gas turbine control and the interlock are not considered. Accordingly, if the gas fuel supply conditions change significantly, decreasing the limit pressure ratio for surging, there is a possibility that surging in the gas compressor cannot be prevented, which, in the worst case, would cause damage to the equipment.

Given this background, for a gas turbine equipped with a gas compressor that compresses gas fuel whose supply conditions change and supplies the gas fuel to a combustor and in which the gas compressor is provided with variable stator vanes, it is desired to develop a gas turbine operating method that can reliably prevent surging by coping with changes in the gas fuel supply conditions.

BRIEF SUMMARY OF THE INVENTION

The present invention has been made to solve the problems described above, and an object thereof is to provide a gas turbine operating method and a gas turbine capable of reliably preventing surging in the gas compressor by coping with changes in the gas fuel supply conditions.

To solve the above problems, the present invention adopts the following solutions.

A gas compressor operating method according to a first aspect of the present invention is a method for operating a gas compressor which compresses gas whose supply conditions change and which is equipped with an intake-flow regulating mechanism, wherein a limit pressure ratio that defines an operational upper limit of a pressure ratio relative to an intake flow rate of the gas compressor or a degree of opening of the intake-flow regulating mechanism to prevent surging in the gas compressor is corrected by multiplying a reference limit pressure ratio calculated from design conditions of the gas compressor by a first correction factor calculated depending on a detected operating-state value of the gas compressor.

With the gas compressor operating method according to the present invention, since a limit pressure ratio that defines the operational upper limit of the pressure ratio relative to the intake flow rate of the gas compressor or the degree of opening of the intake-flow regulating mechanism to prevent surging in the gas compressor is corrected by multiplying a reference limit pressure ratio calculated from the design conditions of the gas compressor by a first correction factor calculated depending on the detected operating-state value of the gas compressor, operation in which the occurrence of surging is reliably prevented can be achieved by using an appropriate limit pressure ratio corrected depending on the operating state of the gas compressor.

In the gas compressor operating method according to the first aspect of the present invention, preferably, the first correction factor is calculated from an intake gas temperature of the gas compressor, which allows correction reflecting the state of the gas fuel that changes with the temperature, as expressed by a state equation.

In such a gas compressor operating method, it is preferable to include a gas constant (R) and a specific heat ratio ($\kappa$) of the intake gas to the gas compressor in the calculation of the first correction factor. That is, the first correction factor is calculated from the intake gas temperature, the gas constant (R), and the specific heat ratio ($\kappa$) of the gas compressor; therefore, even if a gas whose gas composition changes is used as the gas fuel, operation in which the occurrence of surging is reliably prevented can be achieved by using an appropriate limit pressure ratio corrected depending on the operating state of the gas compressor.

Furthermore, in the above gas compressor operating method, it is preferable to include the actual rotational speed of the gas compressor in the calculation of the first correction factor, which further optimizes the correction of the limit pressure ratio, thereby allowing the occurrence of surging to be prevented.

In the gas compressor operating method according to the first aspect of the present invention, preferably, the first correction factor is obtained from a correcting rotational speed ratio ($\alpha$) obtained from the following [Eq. 1], where $N_0$ is a reference rotational speed of the gas compressor, $\kappa_0$ is a reference specific heat ratio of the intake gas to the gas compressor, $R_0$ is a reference gas constant of the intake gas to the gas compressor, $T_0$ is a reference temperature of the intake gas to the gas compressor, N is an actual rotational speed of the gas compressor, $\kappa$ is a present specific heat ratio of the intake gas to the gas compressor, R is a present gas constant of the intake gas to the gas compressor, and T is a present temperature of the intake gas to the gas compressor.

$$\text{Correcting rotational speed ratio } \alpha = \frac{N\sqrt{\kappa_0 R_0 T_0}}{N_0 \sqrt{\kappa R T}} \quad [\text{Eq. 1}]$$

In the above gas compressor operating method, preferably, the gas constant (R) and the specific heat ratio ($\kappa$) of the intake gas to the gas compressor are calculated from a gas composition measured at the inlet side of the gas compressor.

In this case, if the intake gas to the gas compressor is a gas in which a plurality of gases are mixed, the gas constant (R) and the specific heat ratio ($\kappa$) after mixing are obtained from the compositions and flow ratio between the individual gases.

In the above gas compressor operating method, the gas constant (R) and the specific heat ratio ($\kappa$) of the intake gas to the gas compressor may be calculated from a gas composition obtained by conversion from a gas density or the amount of gas generated, which is measured at the inlet side of the gas compressor. If the intake gas to the gas compressor is a gas in which a plurality of gases are mixed, the composition of at least one of the plurality of gases may be obtained by conversion from the gas density or the amount of gas generated.

In the gas compressor operating method according to the first aspect of the present invention, preferably, after being corrected through multiplication by the first correction factor, the limit pressure ratio is corrected through multiplication by a second correction factor which is determined in advance depending on an intake flow rate of the gas compressor or a degree of opening and the actuating direction of the intake-flow regulating mechanism, which makes the limit pressure ratio a more optimized value, thus allowing operation in which the occurrence of surging is more reliably prevented.

In the gas compressor operating method according to the first aspect of the present invention, preferably, the intake flow rate of the gas compressor is a corrected flow rate $Q_0$ (the unit is volume flow rate) obtained from the following [Eq. 2], where Q is an actual intake flow rate of the gas compressor (the unit is volume flow rate), $N_0$ is a reference rotational speed of the gas compressor, $\kappa_0$ is a reference specific heat ratio of the intake gas to the gas compressor, $R_0$ is a reference gas constant of the intake gas to the gas compressor, $T_0$ is a reference temperature of the intake gas to the gas compressor, N is an actual rotational speed of the gas compressor, $\kappa$ is a present specific heat ratio of the intake gas to the gas compressor, R is a present gas constant of the intake gas to the gas compressor, and T is a present temperature of the intake gas to the gas compressor, or a corrected flow rate $G_0$ (the unit is mass flow rate) obtained from the following [Eq. 3], where G is an actual intake flow rate of the gas compressor (the unit is mass flow rate), $N_0$ is a reference rotational speed of the gas compressor, $\kappa_0$ is a reference specific heat ratio of the intake gas to the gas compressor, $R_0$ is a reference gas constant of the intake gas to the gas compressor, $T_0$ is a reference temperature of the intake gas to the gas compressor, N is an actual rotational speed of the gas compressor, $\kappa$ is a present specific heat ratio of the intake gas to the gas compressor, R is a present gas constant of the intake gas to the gas compressor, and T is a present temperature of the intake gas to the gas compressor.

In this case, a corrected flow rate calculated from the actual intake flow rate, the intake gas temperature, and the intake gas pressure of the gas compressor and the gas constant (R) and the specific heat ratio ($\kappa$) of the gas fuel is used as the intake flow rate of the gas compressor for obtaining a limit pressure ratio; therefore, even if a gas whose gas composition changes is used as the gas fuel, operation in which the occurrence of surging is reliably prevented can be achieved by using an appropriate limit pressure ratio corrected depending on the operating state of the gas compressor.

$$\text{Corrected flow rate } Q_0 = \frac{Q\sqrt{\kappa_0 R_0 T_0}}{\sqrt{\kappa R T}} \quad [\text{Eq. 2}]$$

-continued $$\text{Corrected flow rate } G_0 = G \cdot \frac{\sqrt{\frac{\kappa_0 RT}{\kappa R_0 T_0}}}{P/P_0} \quad \text{[Eq. 3]}$$

A method for operating a gas turbine according to a second aspect of the present invention is a method for operating a gas turbine equipped with a gas compressor which compresses gas whose supply conditions change and which supplies the compressed gas to a combustor as gas fuel, the gas compressor being provided with an intake-flow regulating mechanism, wherein an operating method for preventing surging in the gas compressor by defining an operational upper limit of a pressure ratio relative to an intake flow rate of the gas compressor or a degree of opening of the intake-flow regulating mechanism is achieved by the gas-compressor operating method according to the first aspect of the present invention.

In the gas compressor operating method according to the second aspect of the present invention, preferably, the operating method for preventing surging in the gas compressor includes a gas-fuel bypass operation.

In the gas compressor operating method according to the second aspect of the present invention, preferably, an interlock that immediately halts the operation when an operating pressure ratio of the gas compressor has exceeded the limit pressure ratio is provided.

A gas turbine according to a third aspect of the present invention is a gas turbine equipped with a gas compressor which compresses gas whose supply conditions change and which supplies the compressed gas to a combustor as gas fuel, the gas compressor being provided with an intake-flow regulating mechanism, wherein operation for preventing surging in the gas compressor by defining an operational upper limit of a pressure ratio relative to an intake flow rate of the gas compressor or a degree of opening of the intake-flow regulating mechanism is achieved by the gas-compressor operating method according to the first aspect of the present invention.

With the gas turbine according to the second aspect of the present invention and the gas turbine operating method according to the third aspect of the present invention, since the operation for preventing surging in the gas compressor by defining the operational upper limit of the pressure ratio relative to the intake flow rate of the gas compressor or the degree of opening of the intake-flow regulating mechanism is achieved by the gas-compressor operating method according to the first aspect of the present invention, surging in the gas compressor that compresses gas fuel whose supply conditions change is prevented, and thus, stable operation can be achieved.

According to the present invention described above, in a gas turbine equipped with a gas compressor which compresses gas whose supply conditions change and which supplies the compressed gas to a combustor as gas fuel, the gas compressor being provided with variable stator vanes, the limit pressure ratio of the gas compressor is corrected depending on a change in the gas fuel supply condition, and the limit pressure ratio whose value is optimized depending on the gas fuel supply condition is applied. This reliably prevents surging in the gas compressor, thus allowing stable operation, and accordingly, even if a low-calorie gas fuel whose fuel composition changes is used, reliably prevents surging in the gas compressor, thus allowing highly reliable operation without causing damage to the equipment etc.

BRIEF DESCRIPTION OF THE SEVERAL VIEWS OF THE DRAWINGS

FIG. 1 is a diagram showing an embodiment of a gas compressor operating method and a gas turbine equipped with a gas compressor according to the present invention, which is an explanatory diagram of correction of the limit pressure ratio of the gas compressor.

FIG. 2 is a diagram showing a correction factor (first correction factor) of the limit pressure ratio, of which (a) shows the relationship between the intake gas temperature T and the correction factor and (b) shows the relationship between a correcting rotational speed ratio α and the correction factor.

DETAILED DESCRIPTION OF THE INVENTION

An embodiment of a gas compressor operating method a and a gas turbine equipped with a gas compressor according to the present invention will be described hereinbelow with reference to the drawings.

Figure 4:
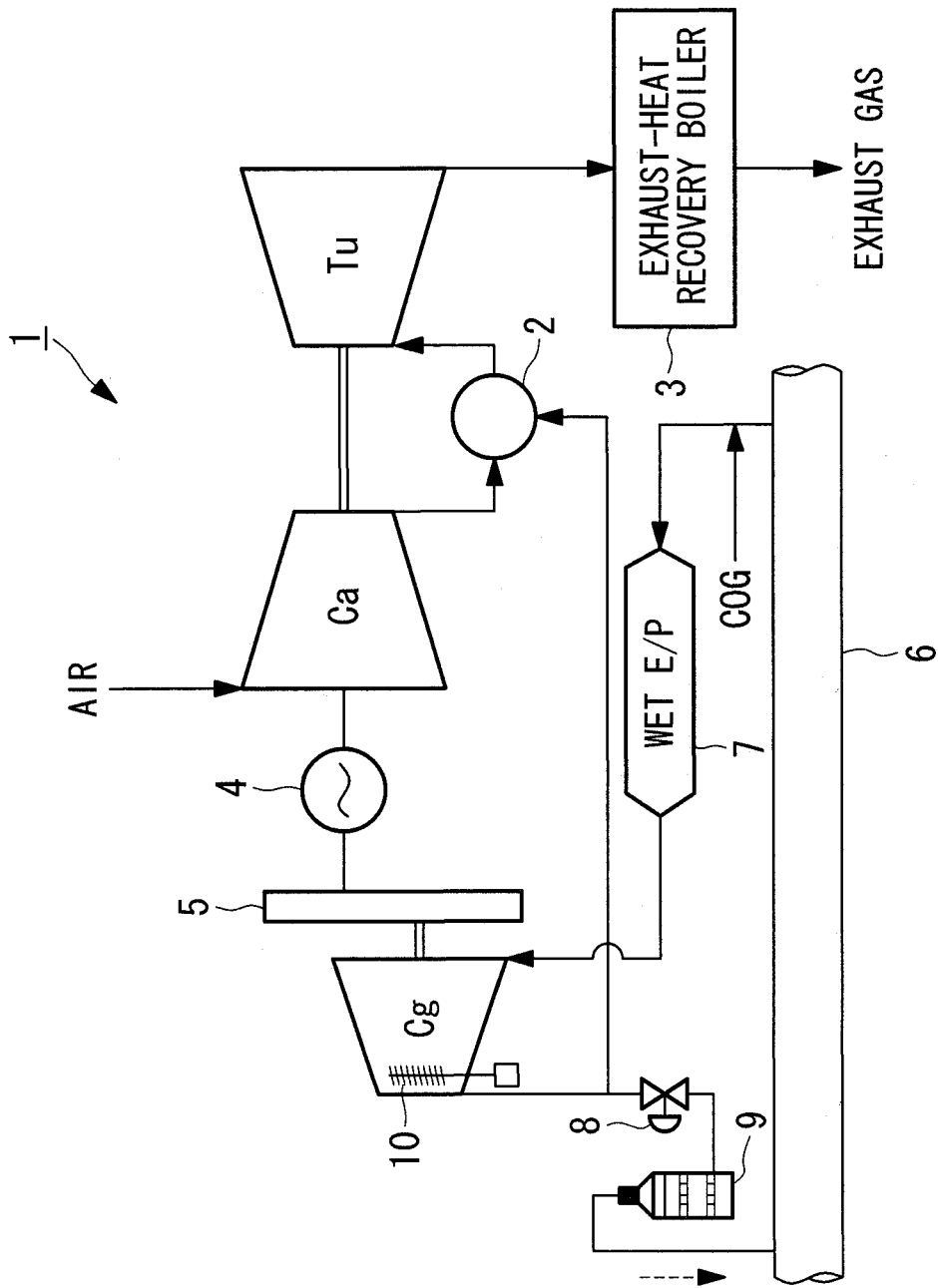
FIG. 4 is a schematic system diagram showing an example of the configuration of a gas turbine according to the present invention.

A gas turbine 1 of this embodiment, shown in FIG. 4, is equipment that operates by using low-calorie gas fuel, for example, steelmaking byproduct gas (BFG) and a mixture of a plurality of gas fuels with different compositions.

The gas turbine 1 is an apparatus that is mainly constituted by a compressor Ca, a combustor (gas turbine combustor) 2, and a turbine Tu.

The compressor Ca takes in air, compresses it, and discharges the high-pressure compressed air. The compressed air discharged from the compressor Ca is taken into the combustor 2 as combustion air and burns together with gas fuel supplied to the combustor 2, forming high-temperature combustion gas. The combustion gas is taken into the turbine Tu and drives the turbine Tu by flowing between moving blades and stator vanes.

The combustion gas that has driven the turbine Tu is used to generate steam by passing through, for example, an exhaust-heat recovery boiler 3 and is discharged to the atmosphere after being subjected to a necessary exhaust gas treatment. A filter and a silencer are generally installed upstream of the compressor Ca.

The illustrated gas turbine 1 is equipped with a generator 4 coaxial therewith at the compressor Ca side. The generator 4 is driven together with the compressor Ca by the output of the turbine Tu to generate electricity.

To use low-calorie gas fuel, the illustrated gas turbine 1 is equipped with a gas compressor Cg that compresses the gas fuel and supplies the gas fuel to the combustor 2. The gas compressor Cg is connected to the generator 4 at the side opposite to the compressor Ca via a motive-power transmission mechanism 5 because it is driven by the output of the turbine Tu similarly to the air compressor Ca and the generator 4. The gas compressor Cg is sometimes driven by separate power from that of the gas turbine 1; the present invention is not limited to this embodiment.

The gas compressor Cg is equipped with variable stator vanes 10 (intake-flow regulating mechanism) that change the cross-sectional area of the flow path of the intake gas fuel.

These variable stator vanes 10 have the function of preventing a stalling phenomenon (compressor stall), called surging, from occurring in the gas compressor by adjusting the degree of opening (pressure loss).

An example of gas fuel compressed by the gas compressor Cg is a gas, such as BFG, introduced through a fuel gas pipe 6 and mixed with coke oven gas (COG), as necessary. This gas fuel is passed through a wet electric precipitator 7 before being supplied to the gas compressor Cg. The wet electric precipitator 7 is a device that separates dust in the gas and collects it.

The main stream of the gas fuel compressed by the gas compressor Cg is supplied to the combustor 2 and burns therein, and a part thereof is returned to the fuel gas pipe 6 via a flow regulating valve 8. That is, the amount of gas fuel compressed by the gas compressor Cg, to be supplied to the combustor 2, is adjusted by adjusting the degree of opening of the flow regulating valve. The gas fuel to be returned to the fuel gas pipe 6 is cooled upon passing thorough a gas cooler 9.

As described above, when operating the gas turbine 1 equipped with the gas compressor Cg, which compresses gas fuel whose supply conditions change and supplies the compressed gas fuel to the combustor 2 and which is provided with the variable stator vanes 10, the operating method of this embodiment corrects a limit pressure ratio, which defines the operational upper limit of the pressure ratio relative to the intake flow rate or the degree of opening of the variable stator vanes 10 to prevent surging in the gas compressor Cg, to a value obtained by multiplying a reference limit pressure ratio calculated depending on the design conditions of the gas compressor Cg by a first correction factor calculated in accordance with a detected operating-state value of the gas compressor Cg.

The corrected limit pressure ratio obtained by multiplying the reference limit pressure ratio by the first correction factor in this manner is referred to as "corrected limit pressure ratio" in the following description.

In the foregoing gas turbine operating method, the first correction factor calculated in accordance with a detected operating-state value of the gas compressor Cg is a value calculated from, for example, the intake gas temperature T of the gas compressor Cg. The intake gas temperature T in this case is the temperature of the gas fuel detected in the vicinity of the inlet of the gas compressor Cg; therefore, it is corrected so as to reflect the changing state (pressure and flow rate) of the gas fuel with temperature. That is, the characteristics of the gas fuel change in accordance with a change in the intake gas temperature T, as expressed by a state equation, which allows correction reflecting the actual state of the compressed gas fuel.

Specifically describing, the correction factor corresponding to the intake gas temperature T has the characteristic that it changes so as to decrease as the intake gas temperature T on the horizontal axis increases, as shown in FIG. 2(a), for example. Such a correction factor characteristic is determined in advance, with the correction factor at a design specification point set at reference 1, in accordance with the specifications of the gas compressor Cg etc. Therefore, the corrected limit pressure ratio, which is corrected using the limit pressure ratio shown in FIG. 1 as the reference limit pressure ratio, moves up and down depending on changes in the intake gas temperature T, as indicated by arrow C in the drawing.

Specifically, the corrected limit pressure ratio in the case where the intake gas temperature T changes in the direction in which it becomes higher than the reference design specification point is corrected in the direction in which the limit pressure ratio is decreased (downward) as compared with the reference limit pressure ratio. In contrast, the corrected limit pressure ratio in the case where the intake gas temperature T changes in the direction in which it becomes lower than the reference design specification point is corrected in the direction in which the limit pressure ratio is increased (upward) as compared with the reference limit pressure ratio. In other words, since the limit pressure ratio becomes larger (higher) as the gas turbine enters operating states with lower intake gas temperatures T, the stable operating range of the gas compressor Cg without surging is increased.

For the foregoing gas turbine operating method, it is preferable to include the gas constant (R) and specific heat ratio ($\kappa$) of the gas fuel to calculate the first correction factor. That is, the calculation of the first correction factor uses the intake gas temperature T of the gas compressor Cg and a value calculated from the gas constant R and specific heat ratio $\kappa$ of the gas fuel.

Specifically, a correcting rotational speed ratio $\alpha$ shown in the following [Eq. 1] is obtained, and the reference limit pressure ratio is corrected using a correction factor corresponding to the correcting rotational speed ratio $\alpha$. That is, as shown in FIG. 2(b), a correction factor characteristic corresponding to the correcting rotational speed ratio $\alpha$ is determined in advance, and the reference limit pressure ratio is corrected using a correction factor corresponding to the calculated reference limit pressure ratio.

$$\text{Correcting rotational speed ratio } \alpha = \frac{N\sqrt{\kappa_0 R_0 T_0}}{N_0\sqrt{\kappa R T}} \quad [\text{Eq. 1}]$$

Here, $N_0$ is the reference rotational speed of the gas compressor Cg, $\kappa_0$ is the reference specific heat ratio of the gas fuel, $R_0$ is the reference gas constant of the gas fuel, and $T_0$ is the reference temperature (intake gas temperature) of the gas fuel, all of which are reference values determined from the design specification points of the gas compressor Cg.

On the other hand, N is the actual rotational speed (present rotational speed) of the gas compressor Cg, $\kappa$ is the present specific heat ratio of the gas fuel, R is the present gas constant of the gas fuel, and T is the present temperature (intake gas temperature) of the gas fuel, all of which are measured values at the point where the gas compressor Cg is actually operated. In this case, for the present specific heat ratio $\kappa$ of the gas fuel, the present gas constant R of the gas fuel, and the present temperature T of the gas fuel, actual measurements obtained at the inlet side (intake side) of the gas compressor Cg are used.

According to [Eq. 1] described above, the correcting rotational speed ratio $\alpha$ can also be calculated as the rotational speed ratio ($N/N_0$) of the gas compressor Cg, and the ratio between the specific heat ratios ($\kappa/\kappa_0$), the ratio between the gas constants ($R/R_0$), and the ratio between the gas temperatures ($T/T_0$) of the gas fuel. Accordingly, in the case where it is assumed that the other values are fixed or in the case where it is determined that influences exerted by the other values are small, the correcting rotational speed ratio $\alpha$ can also be calculated using at least one of the rotational speed ratio ($N/N_0$) of the gas compressor Cg, and the ratio between the specific heat ratios ($\kappa/\kappa_0$), the ratio between the gas constants ($R/R_0$), and the ratio between the gas temperatures ($T/T_0$) of the gas fuel measured at the inlet side of the gas compressor Cg.

That is, for the calculation of the first correction factor described above, of the gas temperature, specific heat ratio, and gas constant of the gas fuel and the actual rotational speed of the gas compressor Cg, which are detected operating-state values of the gas compressor Cg, it is preferable to include the actual rotational speed and one or both of the specific heat ratio and the gas constant, in addition to the gas temperature which normally exerts the most strongest influence. If the number of items of the detected operating-state values used to calculate the first correction factor is large, a corrected limit pressure ratio that reflects the details of the actual operating state, including the composition of the gas fuel, is set, which can therefore further optimize the correction of the limit pressure ratio, thus preventing the occurrence of surging.

The thus-calculated correction factor corresponding to the correcting rotational speed ratio α has the characteristic that it changes to a larger value as the correcting rotational speed ratio α on the horizontal axis increases, as shown in FIG. 2(b). That is, when the correcting rotational speed ratio α becomes larger than a reference value corresponding to the design point, the correction factor also becomes a larger value, and in contrast, when the correcting rotational speed ratio α becomes smaller than the reference value, the correction factor also becomes a smaller value.

Figure 3:
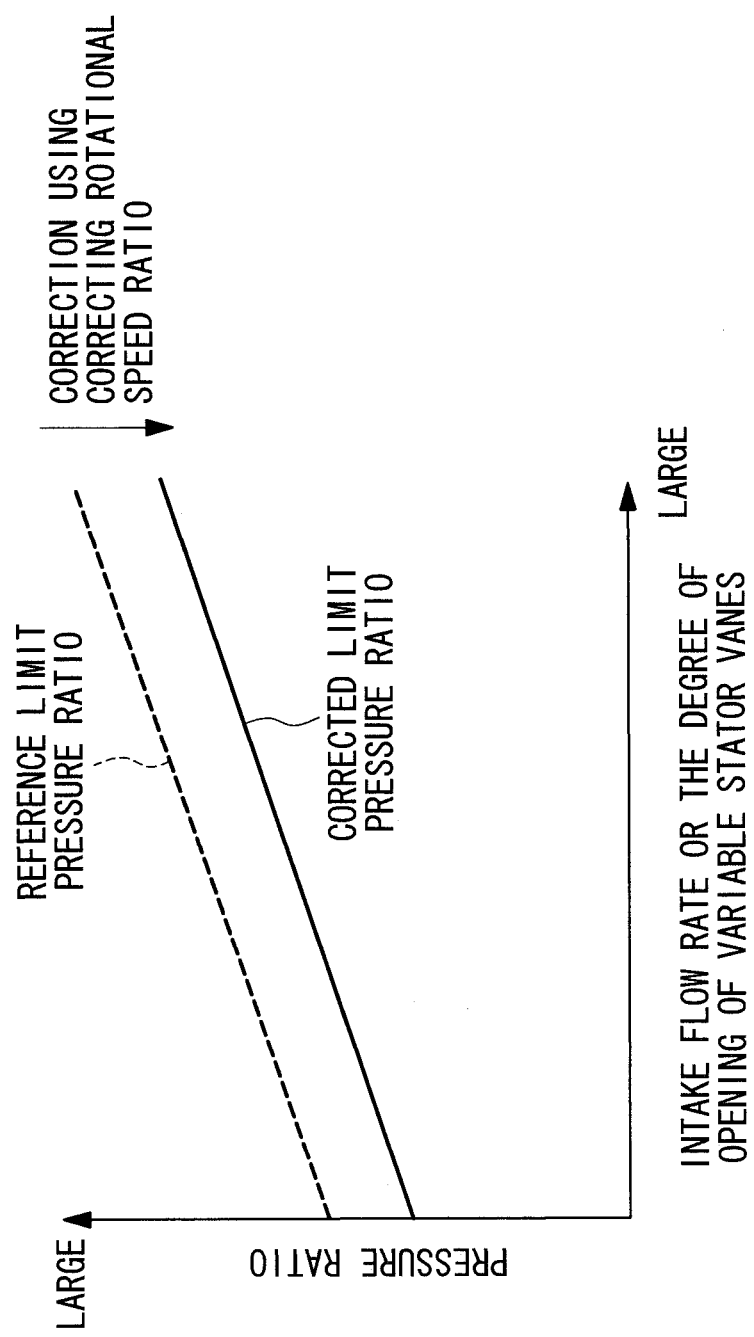
FIG. 3 is a diagram explaining an example of correction of a reference limit pressure ratio using the correcting rotational speed ratio.

Accordingly, as shown in FIG. 3, for example, when the correction factor becomes the reference value 1 or smaller, the corrected limit pressure ratio that is obtained by multiplying the reference limit pressure ratio by the correction factor described above moves downward so that the limit pressure ratio decreases, and in contrast, when the correction factor becomes the reference value 1 or larger, the corrected limit pressure ratio moves upward so that the limit pressure ratio increases.

Using the correcting rotational speed ratio α to calculate the corrected limit pressure ratio as described above allows operation using an appropriate limit pressure ratio that is corrected depending on the operating state of the compressor Cg even if gas fuel whose gas composition changes significantly is used, for example, if a plurality of gas fuels with different compositions are mixed. That is, since a corrected limit pressure ratio that reflects the values of the specific heat ratio κ and the gas constant R, which change depending on the gas composition, can be obtained, in other words, since the gas compressor Cg is operated in such a manner that the gas composition of gas fuel that is actually used is measured at the inlet side of the gas compressor Cg, and a limit pressure ratio corrected on the basis of the specific heat ratio κ and gas constant R corresponding to the actual gas fuel is set, an optimized limit pressure ratio can always be set even if the composition of the gas fuel changes, which allows stable operation in which the occurrence of surging is reliably prevented.

Preferably, the gas composition of gas fuel compressed by the gas compressor Cg is measured at the inlet side of the gas compressor Cg. Here, if the gas fuel is a mixed gas containing a plurality of gas components, first, the compositions and flow ratio between the individual gases before being mixed are obtained. Thereafter, the composition of the mixed gas is obtained from the flow ratio and the gas compositions of the individual gases, and then, the gas constant R and the specific heat ratio κ of the mixed gas are obtained and used to calculate the first correction factor.

Here, the gas composition of the gas fuel can be measured using a gas analyzer (gas chromatograph) that can directly measure the gas composition. Alternatively, even for a gas fuel whose gas composition changes significantly, the gas composition can be estimated by measuring the gas density with a gas densitometer and by converting it from the density, provided that it is a gas fuel whose gas density and gas composition correlate with each other. Specifically, as described on Table 1, assume that the density of gas A is 1.314 kg/m³N, the density of gas B is 1.269 kg/m³N, and the compositions thereof are known. In this case, if the measured density of the gas fuel is 1.29 kg/m³N, an estimated composition can be calculated from the gas compositions of gas A and gas B by interpolation.

TABLE 1

| Composition | | Composition of gas A | Composition of gas B | Composition estimated from measured density | Density of each composition (kg/m³N) |
|---|---|---|---|---|---|
| $H_2$ | Vol % | 15.7 | 12.2 | 13.8 | 0.090 |
| $N_2$ | Vol % | 9.8 | 20.5 | 15.5 | 1.250 |
| CO | Vol % | 35.2 | 41.5 | 38.6 | 1.250 |
| $CO_2$ | Vol % | 36.2 | 23.7 | 29.5 | 1.975 |
| $CH_4$ | Vol % | 3.1 | 2.1 | 2.6 | 0.717 |
| Total | Vol % | 100.0 | 100.0 | 100.0 | — |
| Density | kg/m³N | 1.314 | 1.269 | 1.29 | — |

For a gas fuel whose amount of gas generated and gas composition are correlated, the gas composition can be estimated by measuring the amount of gas generated using a gas calorimeter and converting it. Specifically, as described in Table 2, assume that the lower calorific value of gas A is 7.25 MJ/m³N, the lower calorific value of gas B is 7.31 MJ/m³N, and that the compositions thereof are known. In this case, if the measured lower calorific value of the gas fuel is 7.27 MJ/m³N, an estimated composition can be calculated from the gas compositions of gas A and gas B by interpolation.

Because gas chromatographs are generally expensive, using a relatively inexpensive gas densitometer or gas calorimeter can reduce the cost of the measuring instrument.

TABLE 2

| Composition | | Composition of gas A | Composition of gas B | Composition estimated from measured amount of heat generated | Lower calorific value of each composition (MJ/m³N) |
|---|---|---|---|---|---|
| $H_2$ | Vol % | 15.7 | 12.2 | 14.5 | 10.77 |
| $N_2$ | Vol % | 9.8 | 20.5 | 13.5 | 0.00 |
| CO | Vol % | 35.2 | 41.5 | 37.4 | 12.63 |
| $CO_2$ | Vol % | 36.2 | 23.7 | 31.9 | 0.00 |
| $CH_4$ | Vol % | 3.1 | 2.1 | 2.8 | 35.90 |
| Total | Vol % | 100.0 | 100.0 | 100.0 | — |
| Lower calorific value | MJ/m³N | 7.25 | 7.31 | 7.27 | — |

If the gas fuel is a mixed gas containing a plurality of gas components, the gas composition of a gas component whose composition changes may be measured, or the gas density or the amount of heat generated may be measured, and then the composition may be estimated from the measured density or amount of heat generated. This eliminates the need for measurement of a gas component whose composition does not change, thus allowing the cost of the measuring instrument necessary for measuring gas compositions to be reduced.

Preferably, the foregoing corrected limit pressure ratio, that is, the corrected limit pressure ratio obtained by multiplying the reference limit pressure ratio by the first correction factor, is further corrected by being multiplied by a second correction factor that is determined in advance depending on the intake flow rate or the degree of opening and the actuating directions of the variable stator vanes 10. That is, employing a value corrected by multiplying the reference limit pressure ratio by the first correction factor and the second correction factor makes the limit pressure ratio a more optimized value depending on the actual operating state, which allows operation in which the occurrence of surging is more reliably prevented.

The second correction factor described above differs depending on the specifications of the gas compressor Cg, that is, a value that is appropriately set depending on the conditions of the gas fuel, the gas compressor Cg, and the gas turbine 1, etc. such as a value with which the value of the first correction factor decreases as the intake flow rate or the degree of opening of the variable stator vanes 10 increases, that is, a second correction factor smaller than 1.

The intake flow rate of the gas compressor for obtaining the limit pressure ratio may be a corrected flow rate obtained from the following [Eq. 2].

$$\text{Corrected flow rate } Q_0 = \frac{Q\sqrt{\kappa_0 R_0 T_0}}{\sqrt{\kappa R T}} \quad [\text{Eq. 2}]$$

Here, $Q_0$ is the corrected flow rate of the gas compressor Cg, and the unit is volume flow rate. On the other hand, Q is the actual intake flow rate (present intake flow rate) of the gas compressor Cg, and the unit is volume flow rate. The other symbols are the same as those in [Eq. 1]. The unit of the corrected flow rate may be mass flow rate as given by the following [Eq. 3].

$$\text{Corrected flow rate } G_0 = G \cdot \frac{\sqrt{\frac{\kappa_0 R T}{\kappa R_0 T_0}}}{P/P_0} \quad [\text{Eq. 3}]$$

Here, $G_0$ is the corrected flow rate of the gas compressor Cg, and the unit is mass flow rate. $P_0$ is the reference pressure (intake gas pressure) of the gas fuel. On the other hand, G is the actual intake flow rate (present intake flow rate) of the gas compressor Cg, and the unit is mass flow rate. P is the present pressure (intake gas pressure) of the gas fuel.

A corrected flow rate calculated from the actual intake flow rate, the intake gas temperature, the intake gas pressure, and the gas constant (R) and the specific heat ratio ($\kappa$) of the gas fuel by using the foregoing [Eq. 2] or [Eq. 3] is used as the intake flow rate for obtaining a limit pressure ratio; therefore, even if a gas fuel whose gas composition changes is used, operation in which the occurrence of surging is reliably prevented can be achieved by using an appropriate limit pressure ratio corrected depending on the operating state of the gas compressor.

With the gas compressor operating method of this embodiment, since the limit pressure ratio for preventing surging in the gas compressor by defining the operational upper limit of the pressure ratio relative to intake flow rate or the degree of opening of the variable stator vanes 10 is corrected by multiplying the reference limit pressure ratio calculated from the design conditions of the gas compressor Cg by the first correction factor calculated depending on the detected operating-state values of the gas compressor Cg, an appropriate limit pressure ratio corrected depending on the operating state of the gas compressor can be set, thus allowing operation in which the occurrence of surging is reliably prevented.

This reliably prevents surging in the gas compressor Cg, thus allowing stable operation, and in particular, even if a low-calorie gas fuel whose fuel composition changes is used, reliably prevents surging in the gas compressor Cg, thus allowing highly reliable operation without causing damage to the equipment etc. That is, this can prevent damage to the gas compressor Cg due to a change in gas fuel composition and can increase the operating range without causing surging.

With the method for operating the gas turbine 1 of this embodiment, since an appropriate limit pressure ratio for the gas compressor Cg corrected depending on the operating state of the gas compressor Cg can be set, the bypass operation of the gas fuel can be achieved while monitoring the limit pressure ratio.

Furthermore, an interlock that immediately halts the operation may also be provided to protect the equipment if the operating pressure ratio of the gas compressor Cg has exceeded the limit pressure ratio.

This allows stable operation in which surging in the gas compressor Cg is reliably prevented, and in particular, even if a low-calorie gas fuel whose fuel composition changes is used, reliably prevents surging in the gas compressor Cg, thus allowing a highly reliable operation without causing damage to the equipment. That is, this can prevent damage to the gas compressor Cg due to a change in gas fuel composition and can increase the operating range without causing surging.

In operation in which surging in the gas compressor Cg is prevented by defining the limit pressure ratio, which is the operational upper limit of the pressure ratio relative to the intake flow rate or the degree of opening of the variable stator vanes 10, the gas turbine 1 that adopts the foregoing gas turbine operating method reliably prevents surging in the gas compressor Cg by setting an optimized corrected limit pressure ratio by means of correction that reflects changing gas fuel supply conditions, thus allowing stable operation to continue. That is, since the gas turbine 1 of this embodiment optimizes the corrected limit pressure ratio by applying the correcting rotational speed ratio $\alpha$ to the correction when setting the limit pressure ratio for preventing surging, the surging can be reliably prevented even if not only the intake gas temperature of the gas compressor Cg but also the gas composition of the gas fuel and the actual rotational speed of the gas compressor Cg change.

This can therefore prevent damage to the devices that constitute the gas turbine 1, such as the gas compressor Cg, due to surging in the gas compressor Cg, which is caused by a change in gas fuel composition and a decrease in actual rotational speed, and can also increase the stable operable range without causing surging.

The present invention is not limited to the foregoing embodiment, and modifications may be made as appropriate without departing from the spirit thereof.

What is claimed is:

1. A method for operating a gas compressor which compresses gas whose supply conditions change and which is equipped with an intake-flow regulating mechanism, said method comprising:

determining a reference limit pressure ratio based on design conditions of the gas compressor;

detecting an operating-state value of the gas compressor;

determining a first correction factor based on the detected operating-state value;

deriving a corrected limit pressure ratio by correcting the reference limit pressure ratio using the first correction factor; and operating the gas compressor using the corrected limit pressure ratio, wherein each of the reference limit pressure ratio and the corrected limit pressure ratio defines an operational upper limit of a pressure ratio relative to an intake flow rate of the gas compressor or a degree of opening of the intake-flow regulating mechanism to prevent surging in the gas compressor, and wherein the first correction factor is obtained from a correcting rotational speed ratio ($\alpha$) obtained from the following [Eq. 1], where $N_0$ is a reference rotational speed of the gas compressor, $\kappa_0$ is a reference specific heat ratio of the intake gas to the gas compressor, $R_0$ is a reference gas constant of the intake gas to the gas compressor, $T_0$ is a reference temperature of the intake gas to the gas compressor, N is an actual rotational speed of the gas compressor, $\kappa$ is a present specific heat ratio of the intake gas to the gas compressor, R is a present gas constant of the intake gas to the gas compressor, and T is a present temperature of the intake gas to the gas compressor.

$$\text{Correcting rotational speed ratio } \alpha = \frac{N\sqrt{\kappa_0 R_0 T_0}}{N_0 \sqrt{\kappa R T}}. \quad [\text{Eq. 1}]$$

2. The method for operating a gas compressor according to claim 1, wherein the gas constant (R) and the specific heat ratio ($\kappa$) of the intake gas to the gas compressor are calculated from a gas composition measured at the inlet side of the gas compressor.

3. The method for operating a gas compressor according to claim 1, wherein the gas constant (R) and the specific heat ratio ($\kappa$) of the intake gas to the gas compressor are calculated from a gas composition obtained by conversion from a gas density or the amount of gas generated, which is measured at the inlet side of the gas compressor.

4. The method for operating a gas compressor according to claim 1, wherein if the intake gas to the gas compressor is a gas in which a plurality of gases are mixed, a gas constant (R) and a specific heat ratio ($\kappa$) after mixing are obtained from the compositions and flow ratio between the individual gases.

5. The method for operating a gas compressor according to claim 1, wherein, after being corrected using the first correction factor, the limit pressure ratio is corrected using a second correction factor which is determined in advance depending on an intake flow rate of the gas compressor or a degree of opening and an actuating direction of the intake-flow regulating mechanism.

6. A method for operating a gas turbine equipped with a gas compressor which compresses gas whose supply conditions change and which supplies the compressed gas to a combustor as gas fuel, the gas compressor being provided with an intake-flow regulating mechanism, wherein an operating method for preventing surging in the gas compressor by defining an operational upper limit of a pressure ratio relative to an intake flow rate of the gas compressor or a degree of opening of the intake-flow regulating mechanism is achieved by the gas-compressor operating method according to claim 1.

7. The method for operating a gas compressor according to claim 6, wherein the operating method for preventing surging in the gas compressor includes a gas-fuel bypass operation.

8. The method for operating a gas turbine according to claim 6, wherein an interlock that immediately halts the operation when an operating pressure ratio of the gas compressor has exceeded the limit pressure ratio is provided.

9. A method for operating a gas compressor which compresses gas whose supply conditions change and which is equipped with an intake-flow regulating mechanism, said method comprising:

determining a reference limit pressure ratio based on design conditions of the gas compressor;

detecting an operating-state value of the gas compressor;

determining a first correction factor based on the detected operating-state value;

deriving a corrected limit pressure ratio by correcting the reference limit pressure ratio using the first correction factor; and operating the gas compressor using the corrected limit pressure ratio, wherein each of the reference limit pressure ratio and the corrected limit pressure ratio defines an operational upper limit of a pressure ratio relative to an intake flow rate of the gas compressor or a degree of opening of the intake-flow regulating mechanism to prevent surging in the gas compressor, wherein the first correction factor is calculated from an intake gas temperature of the gas compressor, wherein in the calculation of the first correction factor, a gas constant (R) and a specific heat ratio ($\kappa$) of the intake gas to the gas compressor are included, and wherein the gas constant (R) and the specific heat ratio ($\kappa$) of the intake gas to the gas compressor are calculated from a gas composition measured at the inlet side of the gas compressor.

10. A method for operating a gas compressor which compresses gas whose supply conditions change and which is equipped with an intake-flow regulating mechanism, said method comprising:

determining a reference limit pressure ratio based on design conditions of the gas compressor;

detecting an operating-state value of the gas compressor;

determining a first correction factor based on the detected operating-state value;

deriving a corrected limit pressure ratio by correcting the reference limit pressure ratio using the first correction factor; and operating the gas compressor using the corrected limit pressure ratio, wherein each of the reference limit pressure ratio and the corrected limit pressure ratio defines an operational upper limit of a pressure ratio relative to an intake flow rate of the gas compressor or a degree of opening of the intake-flow regulating mechanism to prevent surging in the gas compressor, wherein the first correction factor is calculated from an intake gas temperature of the gas compressor, wherein in the calculation of the first correction factor, a gas constant (R) and a specific heat ratio ($\kappa$) of the intake gas to the gas compressor are included, and wherein the gas constant (R) and the specific heat ratio ($\kappa$) of the intake gas to the gas compressor are calculated from a gas composition obtained by conversion from a gas density or the amount of gas generated, which is measured at the inlet side of the gas compressor.

11. A method for operating a gas compressor which compresses gas whose supply conditions change and which is equipped with an intake-flow regulating mechanism, said method comprising:

determining a reference limit pressure ratio based on design conditions of the gas compressor;

detecting an operating-state value of the gas compressor;

determining a first correction factor based on the detected operating-state value;

deriving a corrected limit pressure ratio by correcting the reference limit pressure ratio using the first correction factor; and operating the gas compressor using the corrected limit pressure ratio, wherein each of the reference limit pressure ratio and the corrected limit pressure ratio defines an operational upper limit of a pressure ratio relative to an intake flow rate of the gas compressor or a degree of opening of the intake-flow regulating mechanism to prevent surging in the gas compressor, wherein the first correction factor is calculated from an intake gas temperature of the gas compressor, wherein in the calculation of the first correction factor, a gas constant (R) and a specific heat ratio ($\kappa$) of the intake gas to the gas compressor are included, and wherein if the intake gas to the gas compressor is a gas in which a plurality of gases are mixed, a gas constant (R) and a specific heat ratio ($\kappa$) after mixing are obtained from the compositions and flow ratio between the individual gases.

12. The method for operating a gas compressor according to claim 11, wherein the composition of at least one of the plurality of gases is obtained by conversion from the gas density or the amount of gas generated.

13. A method for operating a gas compressor which compresses gas whose supply conditions change and which is equipped with an intake-flow regulating mechanism, said method comprising:

determining a reference limit pressure ratio based on design conditions of the gas compressor;

detecting an operating-state value of the gas compressor;

determining a first correction factor based on the detected operating-state value;

deriving a corrected limit pressure ratio by correcting the reference limit pressure ratio using the first correction factor; and operating the gas compressor using the corrected limit pressure ratio, wherein each of the reference limit pressure ratio and the corrected limit pressure ratio defines an operational upper limit of a pressure ratio relative to an intake flow rate of the gas compressor or a degree of opening of the intake-flow regulating mechanism to prevent surging in the gas compressor, and wherein the intake flow rate of the gas compressor is a corrected flow rate $Q_0$ (the unit is volume flow rate) obtained from the following [Eq. 2], where Q is an actual intake flow rate of the gas compressor (the unit is volume flow rate), $N_0$ is a reference rotational speed of the gas compressor, $\kappa_0$ is a reference specific heat ratio of the intake gas to the gas compressor, $R_0$ is a reference gas constant of the intake gas to the gas compressor, $T_0$ is a reference temperature of the intake gas to the gas compressor, N is an actual rotational speed of the gas compressor, $\kappa$ is a present specific heat ratio of the intake gas to the gas compressor, R is a present gas constant of the intake gas to the gas compressor, and T is a present temperature of the intake gas to the gas compressor, or a corrected flow rate $G_0$ (the unit is mass flow rate) obtained from the following [Eq. 3], where G is an actual intake flow rate of the gas compressor (the unit is mass flow rate), $N_0$ is a reference rotational speed of the gas compressor, $\kappa_0$ is a reference specific heat ratio of the intake gas to the gas compressor, $R_0$ is a reference gas constant of the intake gas to the gas compressor, $T_0$ is a reference temperature of the intake gas to the gas compressor, N is an actual rotational speed of the gas compressor, $\kappa$ is a present specific heat ratio of the intake gas to the gas compressor, R is a present gas constant of the intake gas to the gas compressor, and T is a present temperature of the intake gas to the gas compressor.

$$\text{Corrected flow rate } Q_0 = \frac{Q\sqrt{\kappa_0 R_0 T_0}}{\sqrt{\kappa R T}} \quad [\text{Eq. 2}]$$

$$\text{Corrected flow rate } G_0 = G \cdot \frac{\sqrt{\frac{\kappa_0 R T}{\kappa R_0 T_0}}}{P/P_0}. \quad [\text{Eq. 3}]$$

* * * * *